United States Patent [19]

Hatzmann et al.

[11] 3,790,159

[45] Feb. 5, 1974

[54] AUTOMATIC DOCUMENT HANDLING DEVICE

[75] Inventors: John F. Hatzmann, Rochester; Donald P. Miller, Webster, both of N.Y.

[73] Assignee: Xerox Corporation, Rochester, N.Y.

[22] Filed: May 16, 1972

[21] Appl. No.: 253,721

[52] U.S. Cl. .......................... 271/4, 178/7.6, 271/35, 271/53, 274/4 J, 346/139 A

[51] Int. Cl. .......................... B65h 3/04, B65h 29/22

[58] Field of Search ............ 271/53, 3, 4, 51, 35, 8; 178/7.6, 13; 274/4 J; 346/138, 125, 139 A

[56] References Cited

UNITED STATES PATENTS

| | | | |
|---|---|---|---|
| 2,906,586 | 9/1959 | Collier | 274/4 J X |
| 2,708,405 | 5/1955 | Gegenheimer | 271/53 X |
| 3,335,662 | 8/1967 | Ritzerfeld | 271/53 X |
| 3,664,660 | 5/1972 | Runzi | 271/35 |
| 2,977,179 | 3/1961 | Mason et al. | 346/138 |
| 2,514,974 | 7/1950 | Schauer | 346/138 |
| 3,350,089 | 10/1967 | Niccoli | 271/21 X |
| 3,044,768 | 7/1962 | Hoer | 271/4 |

*Primary Examiner*—Richard E. Aegerter
*Assistant Examiner*—Bruce H. Stoner, Jr.

[57] ABSTRACT

An automatic document handling device is described for use primarily with facsimile transmission systems wherein accurate document positioning is required. A processing drum is provided with a document retention gripper positioned on the surface. In response to an actuation signal the document retention gripper in its retracted position is rotated along with the document processing drum until it is located at a target location. Upon proper positioning the document retention gripper is opened and a document is fed from a supply source to the retention gripper. Suitable switches located along the document feeding path verify the accurate positioning and location of the documents. Upon receipt by the gripper, the gripper is retracted and the document retained. The operating drum surface then rotates through a processing stage for facsimile reception or transmission. At the end of the processing stage, the gripper is opened, a suitable pickoff mechanism rejects the document and the cycle is repeated.

26 Claims, 8 Drawing Figures

AUTOMATIC DOCUMENT HANDLING DEVICE

This invention relates to document handing systems and more particularly to automatic document handling apparatus and transport mechanisms for accurately positioning a document with respect to an operative surface for performing certain functions thereon.

In various types of automatic document handling devices the accuracy with which a document is positioned is important. This is particularly true in facsimile transceiver arrangements where the positioning of a document is a condition precedent to the transmission or reception of a facsimile signal. In such systems, operation is normally initiated by the generation of a signal indicating the readiness of a transmitter to transmit a facsimile signal to a remote receiver. In a ready-to-receive condition, the receiver operates to provide a document in ready position to receive that signal. Synchronization between the transmitting and receiving units in a facsimile system is significant and paper position must be accurately determined prior to an indication by the receiver to the transmitter that it is ready to receive a signal.

Several factors enter into accurate positioning of the document prior to the generation of an indication that the document is in proper position to proceed with an operation. Primarily, since the document must be rotated around the drum by at least one revolution to insure proper scanning or reproduction, a means must be provided on the drum for retaining or gripping the document in position during its revolution with the drum. Further, a means must be provided for accurately positioning the document within the gripper so as to allow the gripping mechanism to properly coact with the document. At the completion of the cycle, a means must be provided for removing the document from the drum. Other general requirements with such a system require a paper input device for stacking and feeding either original documents for transmission or copy paper for reproduction. Further, a mechanism is required to separate a sheet from the paper stack in the input tray and initiate its entry into the input drive mechanism. Drive and guide mechanisms are necessary for conveying paper from the stack separator until its leading edge is contained within a retention bar on the operating drum surface. The drum and retention assembly must cooperate in a manner sufficient to pull the document clear of the input path and transport it past a scan or print head in accordance with the mode of operation of the device.

At the end of the operation it is the function of the machine to remove the document from the processing drum surface and transport it to an output tray. In an automated system, all of the foregoing functions must be accomplished with sufficient accuracy and verification to enable a transmit and receive operation to be synchronized for facsimile operation while at the same time providing sufficient internal safeguards to prevent operating malfunction.

It is thus a principal object of the present invention to provide an automatic document handling system which, with a high degree of reliability, accurately stations a document for processing.

It is a further object of this invention to provide an automatic document handling system for use in a facsimile system which accurately receives, processes and discharges a document in accordance with received signals.

It is still a further object of the present invention to provide an automatic document handling device for use in facsimile transmission systems which provides an accurate monitor of document position for facilitating internal document handling.

It is another object of the present invention to provide a feeder assembly for a document handling system which operates with a relatively high degree of dependability and ease of operation.

Briefly described, the foregoing objects are achieved in an automatic document handling system which provides a document processing drum having mounted thereon a retention or gripper means which is selectively operable in accordance with an externally applied signal. Upon receipt of a proper activation signal, the document processing drum is automatically rotated until the retention means is located at a target position. Upon reaching the target position the retention means is disengaged, a document activation means is initiated, and a document is transported along a document feeding path for location to a position at which the document coacts with the retention means positioned on the operating drum. Upon a determination that the document is accurately positioned within the retention mechanism on the drum surface, the retention means is engaged, the drum is activated and the document processed in accordance with the stations located about the periphery of the drum path. If the operation is a scan, then the document is scanned and an appropriate signal transmitted to the remote unit. If the operation is a receive, appropriate signals are provided to the imaging means and the document printed. Upon completion of the operation, the drum is halted with the retention mechanism located in its proper position. The retention means is then disengaged, and suitable pickoff mechanisms are applied to the document for transporting the document away from the drum along an output path to an output tray.

Document position reliability is insured by the use of a logic system responsive to the presence of a document at various stages along the document feed path between the input tray and the output tray. Various alarm and recycling functions are accomplished in accordance with the inputs generated at these various sensing locations. Further, accurate positioning of the document within the retention mechanism is accomplished by a buckling effect and detection thereof, insuring that the document is fully seated within the retention mechanism and accurately positioned with respect to the drum prior to the processing operation. A multiplicity of buckle sensors can be provided in this regard to fully safeguard against the possibility of jamming or other internal malfunction caused by improper feeding of documents to the drum.

The foregoing objects and brief description as well as further objects will become more apparent from the following more detailed description taken in conjunction with the appended drawings, wherein.

Figures 3, 5A, 5B:
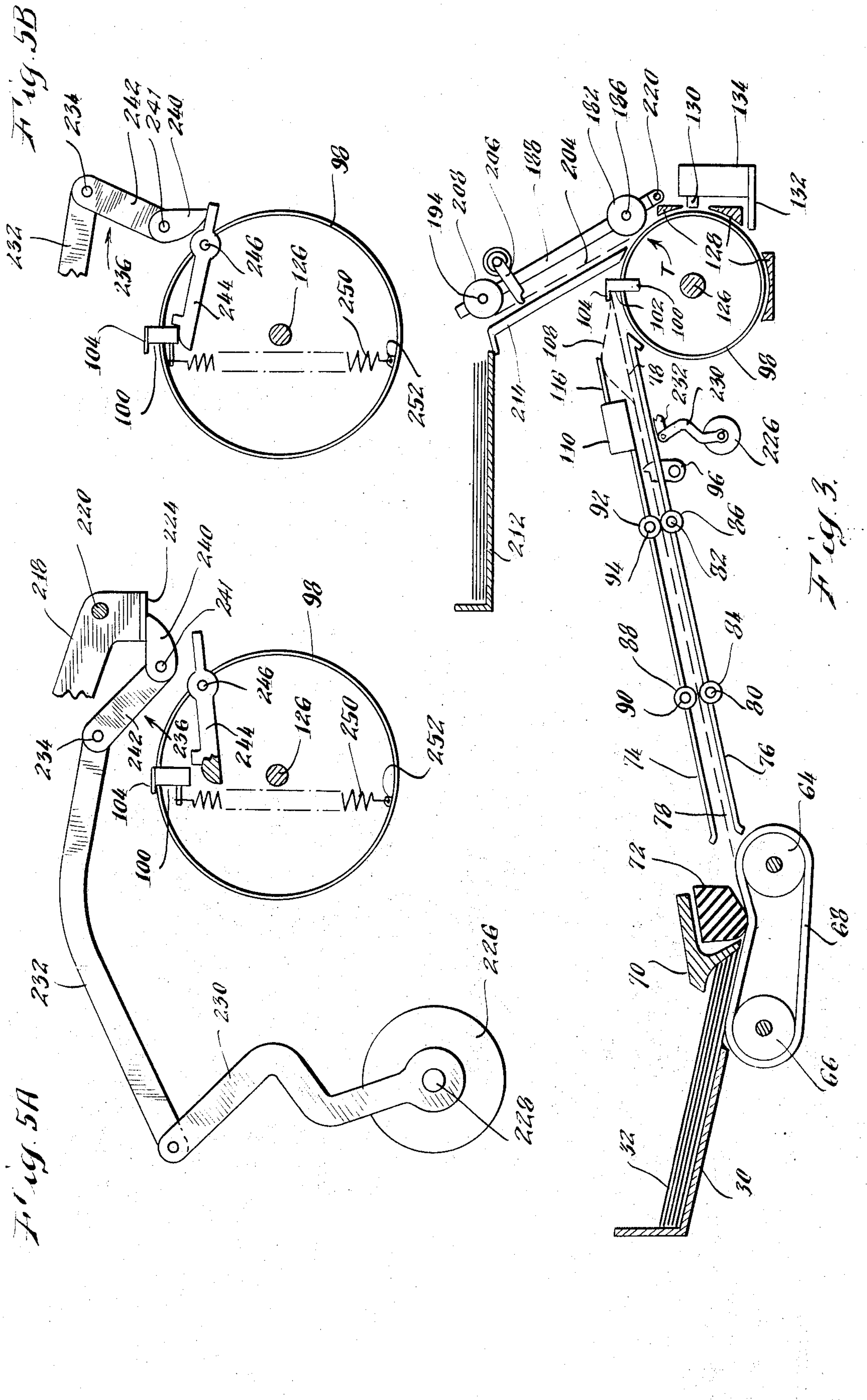
FIG. 3 is a detail right side view of the operation of the document feeding mechanism employed with the present invention.
Figure 6:
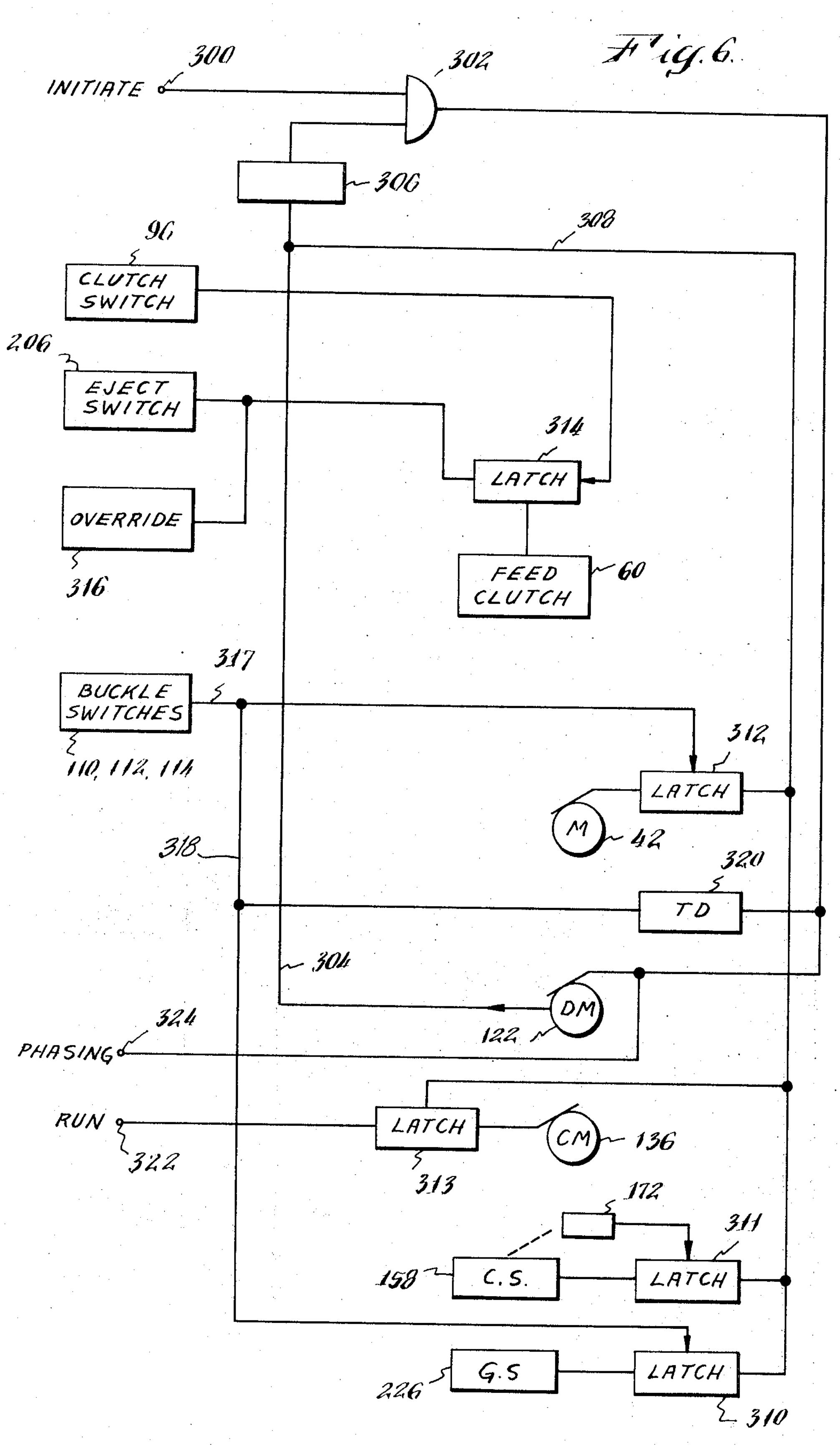

FIGS. 5A and B are detailed right side views of the operation of the retention and removal mechanism employed with the present invention; and, FIG. 6 is a generalized schematic illustration of the electrical operation of the present invention.

Figure 1:
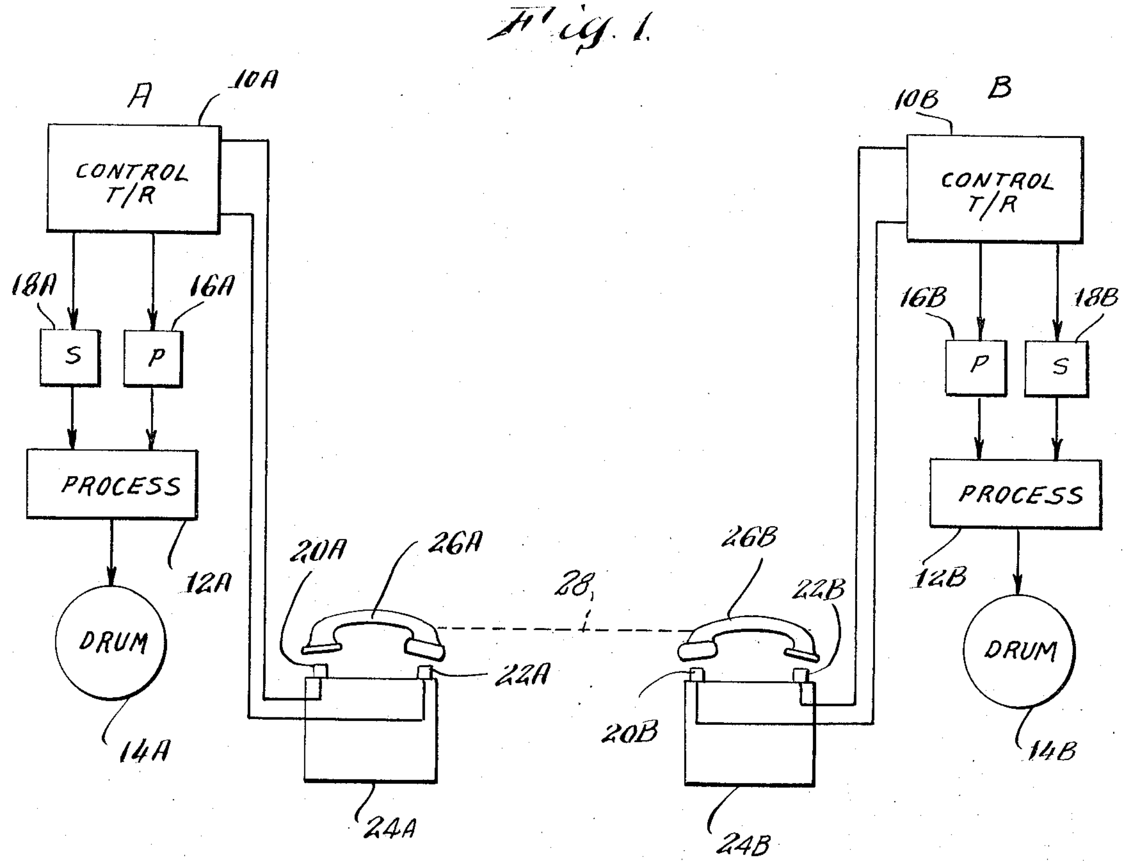
FIG. 1 is a schematic representation of a typical facsimile transmission receiving system with which this invention finds particularly utility.

Referring now to FIG. 1, a system with which the invention finds particularly utility is illustrated. Within the generalized framework of the present invention a suitable transceiver system is shown in FIG. 1 with a first unit located at remote position A and a second unit located at a further remote position B. Each of the transceiver units as shown are similar and each is adapted for transmitting or receiving a signal in accordance with a desired mode of operation. Since the units shown at positions A and B in FIG. 1 are intended to be similar for purposes of this description, like reference numerals will be used to refer to like components and the reference numeral subscripts delineate the distinction between the units at positions A and B. Thus, in FIG. 1 a control unit 10 is illustrated as interacting with a processing unit 12 which coacts in turn with a processing drum 14 through print unit 16 and scan unit 18. The control unit 10 is in turn coupled to appropriate transducers 20 and 22 which form part of an acoustic coupling unit 24. The acoustic coupling unit 24 transceives appropriate signals to a data handset 26 which may be of a conventional voice quality telephone line, which in turn transmits signals over a transmission line 28 to the desired remote unit.

In operation, assuming the unit at location A is transmitting and the unit at B is receiving, an appropriate control signal is entered into the control unit 10A, the transducer 20A, the handset 26A and the data transmission line 28 to the receiving unit. When the receiving unit is ready to receive, it will send an appropriate signal to the transmitting unit. To this end, the processing unit 12B operates to insure that a copy sheet is in proper position upon the drum 14B and that a signal is ready to be received. In this ready condition, the receiving unit B is operative to receive information. Facsimile transceiver devices are described in greater detail, for example in the Saeger et al. U.S. Pat. No. 3,432,613 issued Mar. 11, 1969 and assigned to the assignee of the present invention. It is evident from the foregoing description that automatic positioning of the copy sheet with accuracy is necessary before transceiving of information can be effected.

Figure 2A:
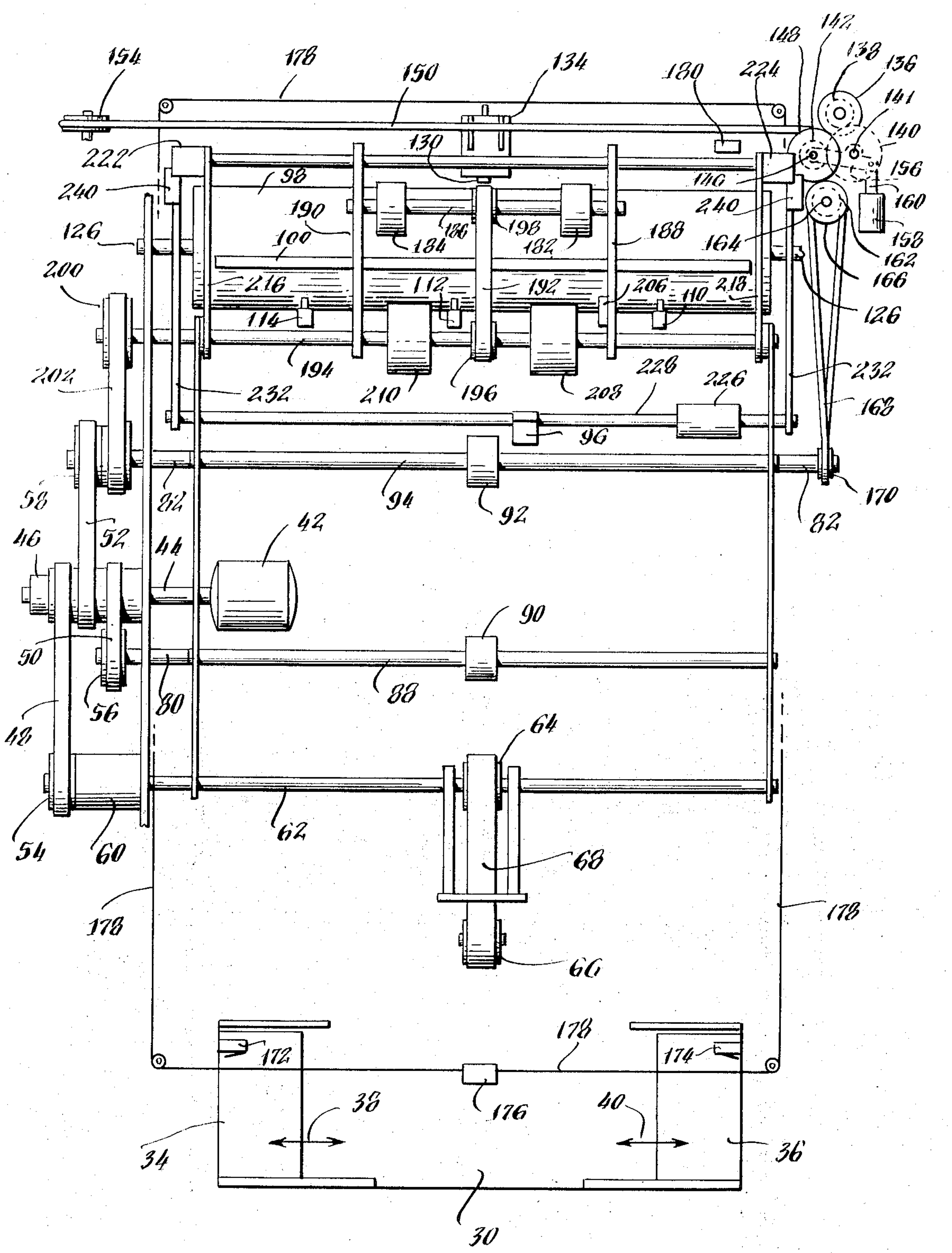
FIGS. 2A and 2B are top and left elevation schematics of an automatic document handling mechanism as employed within the concept of the present invention.

Referring now to FIGS. 2A and B, and to FIG. 3, an automatic document handling system is illustrated which makes provision for the accurate and automatic positioning of documents. Thus, as shown, a paper supply tray 30 is provided with a plurality of documents 32 which may be in the form of individual sheets of record paper or original documents, or in the form of a continuous web which is selectively cut at a desired length, and which are stacked or folded for ultimate feeding into the document handling mechanism. The document tray includes first and second edge guides 34 and 36 which are each adjustable as shown by the arrows 38 and 40 in a direction for accomodating varying length documents.

Figure 2B:
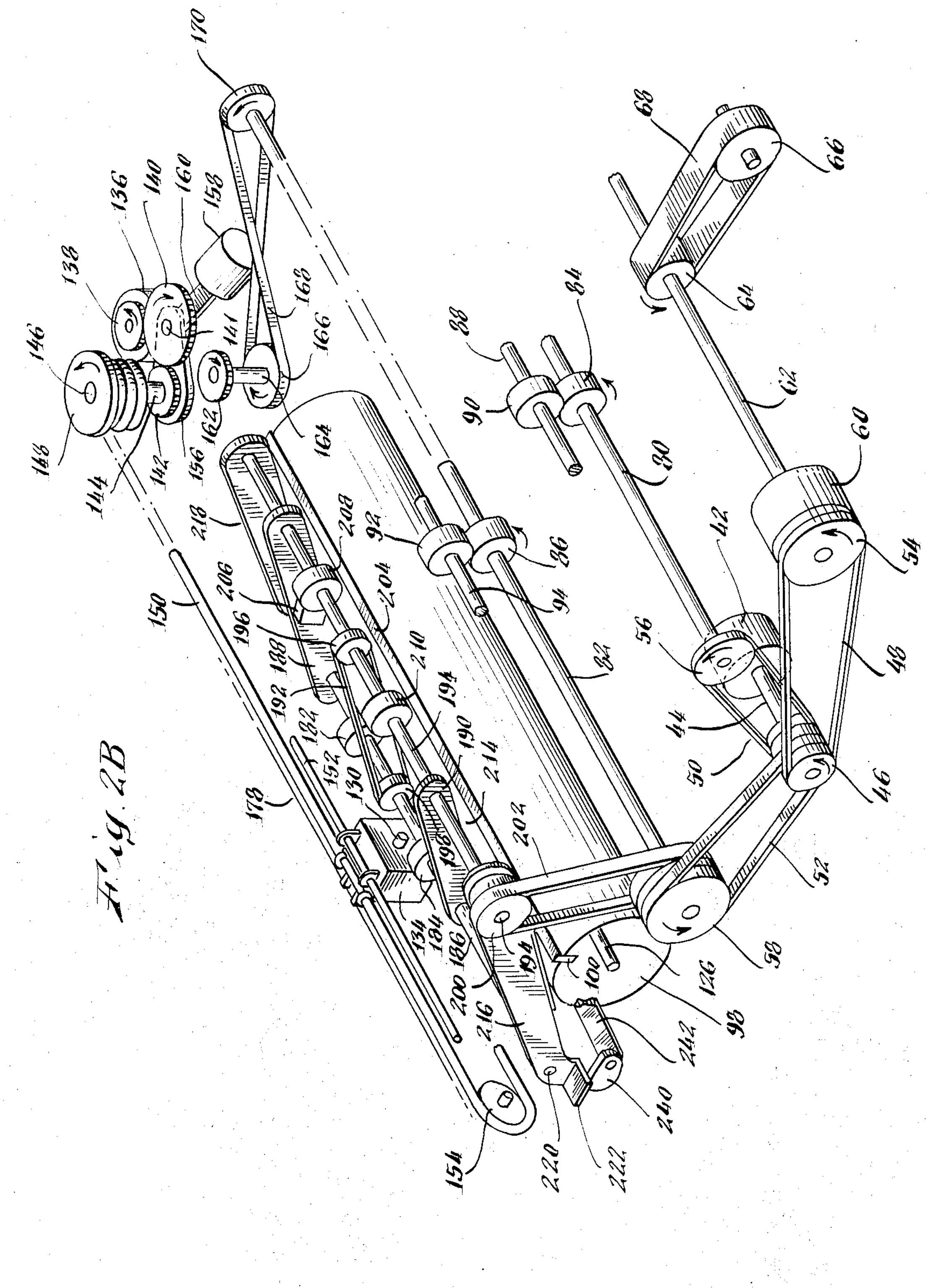

The document feed is off the bottom of the stack, a single sheet at a time. As best illustrated in FIG. 2B, a main feed drive motor 42 provides rotary drive along a shaft 44 in a counter-clockwise direction, to a belt driver 46. The belt driver includes belts 48, 50 and 52 mounted thereon for supplying rotary motion to pulleys 54,56, and 58, in the directions indicated by the respective arrows thereon. The pulley 54 is mounted to an electrically operated clutch 60 which in turn couples the motion of the pulley 54 to the shaft 62. To the shaft 62 is mounted a driving roller 64 which coacts with an idler roller 66 to provide motion to the feed belt 68. As best shown in FIG. 3, the document stack 32 is mounted against an input chute 70 which is profiled to provide proper edge alignment to the stack 32. A retard shoe 72 coacts with the feed belt 68 to prevent the feed belt 68 from feeding more than a single sheet at one time. After activation of the main feed drive motor 42, resulting in forward motion of the feed belt 68, the document thus removed from the bottom of the stack 32 enters between adjacent document guides 74 and 76 along a document feed path illustratively shown as dashed line 78. The spacing between the document guides 74 and 76 need not be greater than is necessary to accommodate the document being fed with a reasonable margin of spacing.

Referring again to FIG. 2A and more specifically to FIG. 2B, activation of the main feed drive motor 42 imparts rotary motion to pulleys 56 and 58, in turn providing rotary motion to shafts 80 and 82 respectively. Coupled to shaft 80 is a feed roller 84 mounted for rotation with shaft 80. Coupled to shaft 82 is a feed roller 86 also mounted for rotation with shaft 82. Coacting with the roller 84 is a pinch roller 86 freely rotatable on the shaft 90. Coacting with the roller 86 is a pinch roller 92 freely rotatable on the shaft 94. As the document exists from the feed belt 68, it enters the first set of coacting rollers 84/88. The spacing between the exit point of the feed belt 68 and the coacting roller set 84/88 is designed to be less than the linear dimension of the document with respect to the feed path 78 so that positive drive of the document from the feed belt 68 is insured until the document is engaged by the pinch action of the roller set 84/88. The document thus continues along the feed path 78 under the drive of roller set 84/88 until it is engaged by the pinch effect of roller set 86/92. Again, the spacing between roller sets 84/88 and 86/92 with respect to the feed path 78 is predetermined to insure positive document drive by roller set 84/88 until engagement by roller set 86/92.

It is noted, for purposes of this description, that although two tandem drive rollers sets 84/88 and 86/92 have been shown, it is possible to employ only a single set of coacting rollers. The use of two sets of tandem rollers however permits the document to be carried over a longer feed path to accommodate machine components and structural requirements.

After engagement of the document by the roller set 86/92, the leading edge of the document is driven against and through a document clutch switch 96. The leading edge of the document thereby activates the clutch switch 96 which in turn provides a signal to the electrically operated clutch 60, thereby disengaging the feed belt drive shaft 62 from the pulley 54, and thus ceasing the feed motion of the feed belt 68. The document continues its forward motion under the action of the roller set 86/92. This switch must be actuated prior to the trail edge of the document exiting from the feed belt, 68 to prevent infeed of the next sheet in the stack, 32.

The document continues its forward feed until it reaches the processing drum 98.

The processing drum 98 is provided with a document retention mechanism or gripper which includes a retractable gripper arm 100, a document bearing surface 102, and a gripper leaf 104. Prior to the initiation of the document feed, the processing drum has been automatically rotated until it reaches the position shown in FIG. 3, with its gripper on top in the document feed path. The positioning of the drum 98 may be accomplished by any of the known mechanisms for arresting the rotation of a rotating body at a specific location, such as shaft angle encoding, sliding switch contact, optical sensing, or the like. Once properly positioned, the gripper arm 100 is raised in a manner to be described further below, such that the document bearing surface 102 lies in the document feed path 78 and the gripper leaf 104 lies above the document feed path 78.

Figure 4:
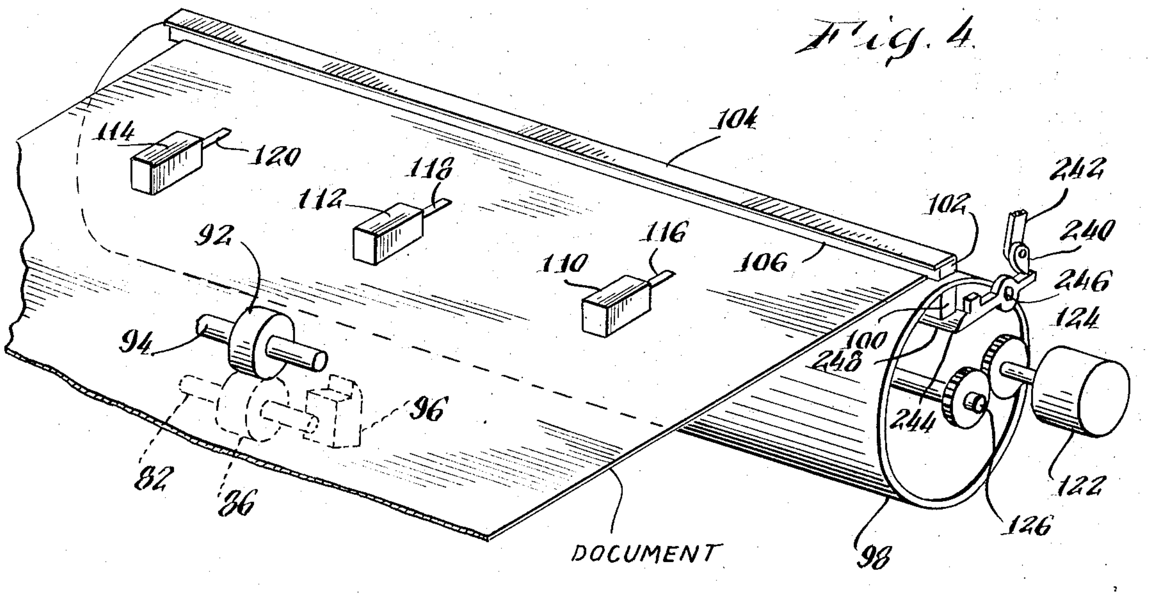
FIG. 4 is a detail isometric view of the operation of the document retention mechanism employed with the present invention.

The driving of the document thus continues by action of roller set 86/92 such that the leading edge of the document, illustrated as 106 in FIG. 4, strikes the document bearing surface 102 along its length. The roller set 86/92 continues to drive the document against the bearing surface 102 until the document actually begins to buckle. As shown in FIG. 3, the resultant buckle acts in a manner transverse to the feed path and is illustrated as section line 108.

Positioned on the upper guide 74 in the region of the buckle 108 is a buckle sensing unit consisting of three buckle switches 110, 112, and 114. Each buckle switch includes an extended actuation arm 116, 118 and 120 respectively. The arms are actuatable in response to the pressure applied thereto by virtue of the document reaching a predetermined buckle height there-beneath. The arms are each positioned above the document feed path 78 by a height sufficient to accommodate an allowable latitude in skew or misalignment of the document, such skew or misalignment being converted into a variation in buckle height across the document. The buckle switches 110, 112, and 114 each act, upon activation by a buckle 108 to supply a signal disabling the main feed motor 42 and thereby ceasing the drive motion of roller set 86/92 and roller set 84/88. In the preferred embodiment, the switches 110, 112 and 114 are each independently operable to disable the main feed motor 42 upon activation by a buckle of predetermined height.

It is noted that the intended ocntrolled buckle is transverse to the direction of document feeding, paralleling the bearing surface 102. To insure proper transverse buckle, the use of conventional dual transverse feed roller sets has been replaced, as described above, by means of a tandem set of rollers, 84/88 and 86/92. This has the effect of driving the document with a drive force in line with the stack separation retard force exerted on the document, rather than the conventional two separate transversely positioned driving points, thereby facilitating formation of the desired transverse buckle.

The buckle switches can be mounted in other positions, in accordance with the predetermined location of the buckle condition. For example, if the document feed is such that a lower buckle is desired, switches can be installed below the feed path. Correspondingly, switches may be installed on both sides of the document, or in varying patterns and positons as desired. It is also noted that the buckle switches can be employed to insure against a malfunction resulting in excessive buckle conditions.

Once the document is properly positioned, as described above, the buckle sensing unit acts to disable the main drive. The same signal is also employed to energize an automatic positioning mechanism, the gripper arm 100 to retract, thus permitting the gripper leaf 104 to constrain the document against the surface of the processing drum 98. This automatic positioning mechanism will be described in further detail below.

After a time sufficient to permit the gripper to have fully retracted and engaged the document, the drum 98 is rotated somewhat greater than one revolution to permit the gripper to pull the document out of the document feed path 78 into wrap-around engagement with the drum 98. In the wrap-around condition, the document will occupy typically 350° of drum circumference. The time for this drum revolution which clears input path, 78, is provided by an electrical time delay of predetermined duration applied as the drum energize signal. Obviously, other modes of determining full gripper retraction can be employed to energize the approximate single drum revolution step.

The drum 98 is driven by an electrically operated motor 122, coupled through appropriate gearing 124 to the central drum shaft 126, illustrated schematically in FIG. 4.

At this point, assuming the presence of certain conditions indicating that the unit is ready to process the document now in position, such conditions to be explained in further detail below, the unit enters its processing cycle.

The document is maintained in proximity with the drum surface by means of a series of circumferentially spaced guides 128 during processing. These guides may be in the form of longitudinally extending plastic or like material members spaced from the drum by a sufficient clearance to maintain the document thereon.

The processing operation employs the use of a scan head 130 such as an optical sensor and an imagining means 132 such as a marking printer located on a carriage unit 134. The carriage is mounted for movement in a direction parallel to the long axis of the drum 98. The scan and print devices operate in accordance with the mode of operation of the transceiver unit. In typical usage, the scan relies on optic generation and reflection and the printing upon a selectively actuated marking tip. Examples of the operation of scanning and marking devices employed in conjunction with facsimile transmission will be found in the aforementioned Saeger et al. U.S. Pat. No. 3,432,613 as well as in the Johnson U.S. Pat. No. 3,598,910 also assigned to the assignee of the present invention.

During processing, the carriage unit 134 traverses the length of the drum, scanning the document in a helical pattern based upon a desired number of lines per inch. A typical scan time can occupy, but is not limited to, four or six minutes, depending upon the resolution and the transmission capability of the facsimile system.

Referring to FIGS. 2A and 2B, the initial carriage position is at the right hand limit position. The carriage unit 134 is driven at the proper speed for processing, to the left, by a carriage drive motor 136 acting through a carriage drive gear 138. A freely rotating idler gear 140, rotatable about the pivot point 141, transfers the motion of the drive gear 138 to a capstan belt drive gear 142 driving the shaft 144 about the axis 146 along with the capstan 148 which in turn applies movement to the belt 150. The belt 150, which may be in the form of an O ring is attached to the carriage unit 134 which is in turn mounted for longitudinal movement on a fixedly positioned shaft 152. The belt 150 completes its circuit about the freely rotating pulley 154.

The gear 142 and 140 are maintained in mesh by a link 156. The link 156 is adapted for rotary movement about the axis 146 to permit a planetary motion of the gear 140 with respect to the gear 142. This planetary motion is provided by means of a solenoid unit 158, having a retractable arm 160 operable in response to energization of the solenoid unit 158. Retraction of the arm 160 by activation of the solenoid unit 158 results in disengagement of the gear 140 from the drive gear 138 and engagement with a carriage return gear 162. The gears 138, 140, 142 and 162 are all physically positioned in the same plane for engagement. The gear 162 is driven through the shaft 164 by capstan 166, belt 168, which may also be an O ring, from the power take off pulley 170 of shaft 82, which is in turn driven from the main feed motor 42. Thus, when the processing cycle is completed and carriage return is desired, an appropriate signal energizes the solenoid 158, permitting the relatively high speed main feed motor 42 to return the carriage 134 to its initial position. Since the end of one processing cycle initiates the next document feed cycle, the main feed motor will be in its activated condition for both feeding the next successive document from the stack 32 and returning the carriage unit 134 to its initial position. The processing cycle, and thus the limit of the travel of carriage 134 is definable by the position of limit switches 172 and 174 which are activated by means of a carriage block 176 carried on a cable 178 driven in accordance with the movement of the carriage. The limit switches, which are preferably pressure activated micro switches, can be moved towards or away from each other, corresponding to the length of documents to be scanned. By physically coupling the limit switches 172, 174 to the document edge guides 34 and 36 adjustment of those guides to the document length automatically sets the limit switches.

Upon completion of a scan, activation of a limit switch, i.e. 174, causes the carriage unit 134 to be returned to its initial position automatically. As explained above, this is done by activation of the carriage solenoid 158 which in turn disengages the carriage drive motor 136 from the carriage capstan 148 and couples the higher speed main feed motor drive to return the carriage unit 134 to its initial position. The initial position is defined by the limit switch 172 which will disconnect the drive upon impact activation caused by movement of the carriage block 176. In addition, for safety, an additional limit switch 180 is positioned at the limit of the furthest path of travel of the carriage unit 134 to prevent the carriage from being over driven. The activation of the limit switch 172 or 180 indicating carriage return deactivates the solenoid 158, returning the carriage motor 136 as the carriage drive unit. Prior to this time, the carriage motor 136 has been deactivated. The processing cycle can also terminate by means of an externally applied stop signal, giving rise to the same sequence set forth above. The reinitiation of the feed cycle by the end of the processing cycle again acts to rotate the drum 98 to a position with the gripper on top. In response to a signal indication that the drum has stopped with the gripper mechanism on top, a signal is supplied to raise the gripper arm 100 from the drum surface. By virtue of a mechanism to be described further below, document pick off roller 182 and 184 are thereby caused to descend to the drum surface to the point T, shown in FIG. 3. The point T is a location near the trailing edge of the document.

The document pick off rollers 182 and 184 are supported for rotation by a shaft 186 journaled into side frame members 188 and 190. A drive belt 192 provides rotation from a coacting rotating shaft 194 through pulleys 196 and 198, the shaft 194 driven in turn from the main motor drive 42 through a pulley wheel 200, belt 202, and pulley 58.

Placing rollers 182 and 184 in position on the document trailing edge permits the document to be picked off the drum surface and conveyed along a document feed path 204 through a document eject switch 206, further eject rollers 208 and 210 mounted for rotation on shaft 194, and to the document storage tray 212. The document eject switch 206, shown as mounted on the frame member 188, is positioned to provide a signal in response to the leading edge of the removed document (the trailing edge when wrapped around the drum), thus indicating proper removal of the document.

The document feed path 204 lies between a lower document guide 214 and an upper set of document guides formed by the lower edges of outer frame members 216 and 218. The lower edges of frame members 190 and 188 also serve as upper document guides for the feed path 204. The structure of the entire pick off frame is completed by a shaft 220 interconnecting the bottom portions of outer frame members 216 and 218, and inner frame member 188 and 190. Each outer frame member 216 and 218 includes an extending leg portion 222 and 224 respectively, the functions of said leg portions to be described in further detail below.

Referring now to FIGS. 5A and 5B in particular, and FIGS. 2A, 2B and 4 in general, the automatic positioning mechanism for simultaneously placing the pick off rollers 182 and 184 in and out of position and for raising and allowing lowering of the gripper is illustrated in greater detail. Specifically, the mechanism includes an electrically actuatable two position rotary solenoid 226, rotatable about a point 228 in a clockwise direction as shown in FIG. 3. The solenoid is positioned below the feed path 78 and near the drum. A first link 230 is mounted to the point 228 and rotates with the solenoid 226. The first link 230 is pivotally mounted to a second link 232, which in turn is pivotally mounted through a pivot 234 to a cam link 236. The cam link 236 includes a cam member 240 fixed to a leg 242 and adapted to rotate therewith about fixed pivot 241. The gripper arm 100 is provided in the drum 98 along with a cooperating gripper cam 244, pivotable about a fixed point 246. As shown in FIG. 4, the gripper cam 244 has a face portion 248 adapted for contact with the gripper arm 100.

The gripper arm 100 is normally held in a retracted position, FIG. 5A, by action of the extension spring 250 which biases the gripper arm downward such that the gripper leaf 104 is held against the drum. The spring 250 is held in position by means of a fixed pin 252.

In this position, the cam 240 exerts upward pressure on the leg portion 224 and raises the frame 218, shaft 220 and the entire document eject mechanism for maintaining the rollers 182 and 184 away from the drum surface. When the solenoid 226 is activated, it undergoes a clockwise rotation, causing movement of links 230 and 232 to the right. As a result, the cam link 236 rotates clockwise about fixed pivot 241 such that the cam 240 undergoes approximately a 90° rotation, as shown in FIG. 5B and FIG. 4. The cam 240 exerts downward pressure on the gripper cam 244, causing same to rotate about the pivot point 246, thereby raising the gripper arm 100 against the spring pressure. At the same time, by removing the upward pressure from the leg portion 224, the frame 218 descends unimpeded until the rollers 182 and 184 strike the document on the drum surface for ejection. As shown in FIG. 2A, the solenoid extends a central shaft on both sides of the unit, thereby permitting like numbered components forming a second linkage to act on both sides of the eject frame to raise leg portions 222 and 224 together, and conversely to raise both sides of the gripper arm 100 together. It is noted that in the foregoing description, physically activated switching units such as clutch switch 96 and eject switch 206 have been described, however it will be understood that these switches may operate photoelectrically, or by any other known sensing principal.

Referring now to FIG. 6, the sequence of operations are illustrated from an electrical view point in a simplified form of logic control. Where possible, like reference numerals have been employed to represent previously discussed components. Use of the term latch is intended to mean a device which will activate an output when signalled on one input line, and deactivate when signalled on its other input line.

An initial operating signal is supplied, from an external source, to terminal 300, indicating beginning of a machine operation, and that all external conditions necessary to begin an automatic document handling cycle are present. The signal is gated through a gate 302 for initiating a start operation by activating the drum motor 122 and rotating the drum until the gripper is positioned on top in the document feed path 78. Indication of proper position, is fed along line 304 to a detector 306 and disengaging gate 302 for stopping the drum motor 122 and at the same time: opening the gripper by applying a signal on line 308 to the gripper solenoid 226 through a latch 310, starting the main feed motor 42 by applying the signal on line 308 through a latch 312 to the motor 42, disengaging the carriage motor 136 through the latch 313, and activating the carriage return solenoid 158 through the latch 311. If a prior document on the drum is properly fed out, the activation of the eject switch 206 applies an input signal to the latch 314 for connecting the feed clutch 60 and driving the feed belt 68. If this is to be the first document, an override control 316 is employed to provide a simulated eject signal to the latch 314 and operate clutch 60.

After a document has fed out of the stack and reaches the clutch switch 96, the clutch switch will provide a signal to the latch 314, disabling same and causing the feed clutch to disengage the feed belt from the main feed motor. The document continues to drive toward the gripper by virtue of the drive roller sets. During this time period, the carriage unit 134 will have achieved its initial position, activating limit switch 172 (or 180) and thereby apply a cutoff signal to the latch 311, disengaging the carriage return solenoid 158 and resetting the now dormant carriage motor 136 in position to drive the carriage unit 134.

The main feed motor 42 continues to drive the document to the gripper, causing same to strike the upraised gripper arm as described above and to buckle, activating the buckle switches to provide a buckle switch signal along line 317 to the latch 312, disengaging the drive of feed motor 42 and providing a further signal on the line 318 disabling the latch 310 and allowing the gripper solenoid 226 to return to its initial position, gripper in position. After a time delay provided by the time delay circuit 320 sufficient to permit the gripper to engage, the buckle signal is applied to the drum motor 122 to set up somewhat more than one revolution, sufficient to pull the document out of the feed path 78 and to wrap around the drum.

If all of the foregoing operations have been effected correctly, i.e., clutch switch activated, eject switch activated, and carriage returned, the unit can then await receipt of a signal indicating that another unit is ready to send or receive. The initial part of processing, referred to as phasing, can be applied at this point in the form of a signal on input 322, which will activate the drum motor 122 for a time sufficient to complete phasing. The phasing period may include information relating to speed of a remote transmission carriage unit, for example. Next, information transmission is begun by applying a run signal to terminal 324, activating the carriage motor 136 which drives the carriage unit 134 for processing the document.

Processing is completed by means of limit switch 174 being activated, or by means of an externally applied stop signal, either of which places a signal on input line 300, and the unit repeats the automatic document handling cycle.

Obviously, variations of logic can be employed to direct and respond the operation of the accurate position automatic feeding device described herein, the foregoing exemplary explanation being provided solely to illustrate that logic circuitry is employable to initiate and respond to the conditional operation of the invention.

While this invention has been particularly shown and described with reference to an exemplary embodiment and variation thereof, it will be obvious to those skilled in the art that the foregoing examples as well as suggested alternatives and as well as other changes and modifications in form and detail may be made without depicting from the scope and apirit of the present invention.

What is claimed is:

1. An automatic document processing, feeding and handling system comprising:

means providing a document feed path, means for feeding a document into said path, means for driving said document along said feed path to a processing device, means provided at said processing device for retaining said document in position in response to proper positioning of said document at said processing device, means cycling said processing device for processing said document, document removal means responsive to completion of processing for removing said document from said processing device, and an electrically actuated mechanism having a linkage occupying a first position causing activation of said means for retaining and a second position for releasing said means for retaining, said second position further actuating said document removal means, and said first position disengaging said document removal means.

2. The combination of claim 1 further including a first switching means positioned in proximity to said document and said document retaining means, said first switching means responsive to the buckling of said document caused by said driving means overdriving said document against said document retaining means for disengaging said means for driving said document.

3. The combination of claim 1 wherein said means for retaining said document includes a document bearing surface extending at least the width of said document relative to said feed path, said means for driving including a single roller set coacting with said document for exerting drive force thereon at a single point along an axis transverse to the direction of said document.

4. The combination of claim 3 including a second roller set positioned in tandem with said first set.

5. An automatic document feeding and processing device comprising:

first means for feeding a document or the like along a feed path, a processing drum including document retention means having a document bearing surface, means responsive to a first signal for rotating said drum until said document retention means is positioned along the document feed path, second means for driving said document into said retention means along said document bearing surface, third means responsive to a first signal indicating proper positioning of said document with respect to said retention means for disengaging said first and second means and activating a fourth means, said fourth means causing said retention means to retain said document against said processing drum, fifth means responsive to a second signal indicating proper document retention for causing said drum to cycle and process said document, said fourth means responsive to completion of said cycle for releasing said retention means and removing said document, said fourth means including a pickoff mechanism for removing a document from said drum and conveying said document along a document removal path, switching means in said removal path and responsive to the presence of a document thereon to indicate proper removal of a document from said drum prior to initiation of the next operating cycle.

6. The combination of claim 5 wherein said document originates from a source of documents and said source includes a document stacking tray having a plurality of documents, and said first means includes a feed belt for feeding a document from the bottom of said tray along said feed path, and a document retard mechanism for inhibiting the feeding of documents other than the said bottom document along said feed path.

7. The combination of claim 5 wherein said document retention means includes a gripper mechanism having an arm and a retaining leaf mounted thereon, said gripper mechanism positioned with said drum and including a spring biasing said gripper mechanism in a normally retracted position.

8. The combination of claim 5 wherein said means for retaining said document includes a document bearing surface extending at least the width of said documents relative to said feed path, said means for driving including a single roller set coating with said document for exerting drive force thereon at a single point along an axis transverse to the direction of said document.

9. The combination of claim 8 including a second roller set positioned in tandem with said first set.

10. The combination of claim 5 wherein said third means includes switching means responsive to a buckle condition of said document resulting from the drive force of said second mean against said document bearing surface.

11. The combination of claim 10 wherein said switching means includes a plurality of switches each having an extended actuation arm, each switch actuable in response to pressure applied to said arm, means positioning each of said switches above said document feed path by a height relative to each said arm and said feed path sufficient to accommodate a variation in buckle height representative of document misalignment.

12. The combination of claim 5 wherein said device includes a movable carriage including document processing means mounted thereon and operative in conjunction with said document for effecting said processing and further including means for driving said carriage from an initial position to a final position for said processing, and means for returning said carriage from said final position to said initial position.

13. The combination of claim 12 wherein said carriage includes limit switching for determining said initial and final position, said limit switching including a first limit switch corresponding to said initial position, and a second limit switch corresponding to said final position, a cable, said cable coupled to said carriage and movable therewith, a cable block mounted on said cable and having movement therewith between a first position representing the initial position of said carriage and a second position representing the final position of said carriage, and position means for mounting said first limit switch in proximity to said first position of said cable block for activation thereby, and for mounting said second limit switch in proximity to said second position of said cable block for activation thereby, said first and second position distance thereby defining the traverse of said carriage.

14. The combination of claim 13 wherein said position means including said limit switches are adjustable to the dimension of a document transverse to said feed path.

15. An automatic document feeding and processing device comprising, a source location for documents, first means for feeding documents from said source along a feed path, second means positioned along said feed path for driving said document toward a processing drum, said processing drum including a retention mechanism for retaining said document against said drum and including a document bearing surface adapted to receive the length of the leading edge of said document along said document bearing surface from said second means, said document having a predetermined length with respect to said feed path, first switching means positioned along said feed path for disengaging said first means for feeding in response to the presence of a document at said second means, said second means including first and second tandem roller sets for driving said document, said second means driving said document against said bearing surface causing a buckle condition in said document, second switching means responsive to said buckle condition for disengaging said second means, and allowing said retention mechanism to retain said document, means for cycling said drum and processing said document, third means responsive to completion of said processing for releasing said retention mechanism and engaging a pickoff mechanism, said pickoff mechanism including a plurality of pickoff rollers engageable with the trailing edge of said document and transporting said document along a document eject path, and a second switching means positioned along said document eject path for providing a signal indicating removal of said document from said drum, said first means responsive to said signal as a condition for activation of said first means.

16. The combination of claim 15 wherein said device includes a movable carriage operable between an initial and final position and having document processing stations thereon, and said third means includes means for returning said carriage to its initial position.

17. The combination of claim 16 wherein said means for returning said carriage includes means operable between a first position and a second position, said first position coupling a first drive source to said carriage for causing said carriage to move from said initial to said final position and said second position coupling a second drive source to said carriage for causing said carriage to move from said final position to said initial position.

18. The combination of claim 17 wherein said carriage includes limit switching for determining said inital and final position, said limit switching including a first limit switch corresponding to said final position, a cable, said cable coupled to said carriage and movable therewith, a cable block mounted on said cable and having movement therewith between a first position representing the initial position of said carriage, and position means for mounting said first limit switch in proximity to said first position of said cable block for activation thereby, and for mounting said second limit switch in proximity to said position of said cable block for activation thereby, said first and second position distance thereby defining the traverse of said carriage.

19. The combination of claim 18 wherein said position means including said limit switches are adjustable to the dimension of a document transverse to said feed path.

20. A document feeding and processing device comprising first means for feeding a document along a document feed path to a processing station, second means responsive to proper positioning of said document at said station for disengaging said first means, third means engagable for retaining said document at said processing station for processing said document, fourth means engagable for removing said document from said station after processing, and fifth means responsive to a first condition for engaging said third means while disengaging said fourth means and to a second condition for disengaging said third means while engaging said fourth means.

21. The combination of claim 20 wherein said third means includes a retractable document gripping mechanism including a retractable arm and a document engaging leaf said arm movable between a first position for disengaging a document with said leaf and a second position for engagement of a document, said fourth means includes a document removal path formed by a frame member, said frame member pivotal about a fixed point from a first position engagable with a document at said processing station and a second position remote from said processing station, and said fifth means includes a linkage arm movable between a first position and a second position, said fifth means first position resulting in placing said third and fourth means in their respective first positions and said fifth means second position resulting in placing said third and fourth means in their respective second positions.

22. The combination of claim 21 wherein said fifth means further includes a solenoid, said solenoid including said linkage arm and being electrically actuatable for movement between said linkage arm first and second positions.

23. The combination of claim 22 wherein said solenoid includes a shaft, said shaft having coupled thereto a first and a second linkage arm, each of said linkage arms actuable between said first and second linkage arm positions and each of said linkage arms being coupled to opposite ends of said third and fourth means.

24. The combination of claim 20 wherein said device includes a movable carriage including document processing means mounted thereon and operative in conjunction with said document for effecting said processing and further including means for driving said carriage from an initial position to a final position for said processing, and means for returning said carriage from said final position to said initial position.

25. The combination of claim 24 wherein said carriage includes limit switching for determining said initial and final position, said limit switching including a first limit switch corresponding to said initial position, and a second limit switch corresponding to said final position, a cable, said cable coupled to said carriage and movable thereiwith, a cable block mounted on said cable and having movement therewith between a first position representing the initial position of said carriage and a second position representing the final position of said carriage, and position means for mounting said first limit switch in proximity to said first position of said cable block for activation thereby, and for mounting said second limit switch in proximity to said second position of said cable block for activation thereby, said first and second position distance thereby defining the traverse of said carriage.

26. The combination of claim 25 wherein said position means including said limit switches are adjustable to the dimension of a document transverse to said feed path.

* * * * *